United States Patent [19]
Avnon et al.

[11] Patent Number: 5,559,977
[45] Date of Patent: Sep. 24, 1996

[54] METHOD AND APPARATUS FOR EXECUTING FLOATING POINT (FP) INSTRUCTION PAIRS IN A PIPELINED PROCESSOR BY STALLING THE FOLLOWING FP INSTRUCTIONS IN AN EXECUTION STAGE

[75] Inventors: Dror Avnon, Milpitas; Harshvardhan P. Sharangpani, Santa Clara; Jonathan B. Sweedler, Sunnyvale, all of Calif.

[73] Assignee: Intel Corporation, Santa Clara, Calif.

[21] Appl. No.: 328,395

[22] Filed: Oct. 24, 1994

Related U.S. Application Data

[63] Continuation of Ser. No. 924,742, Aug. 4, 1992, abandoned.

[51] Int. Cl.$^6$ ............................................. G06F 9/38
[52] U.S. Cl. ..................... 395/375; 364/748; 395/733; 395/800
[58] Field of Search ..................... 364/748; 395/375, 395/575, 800

[56] References Cited

U.S. PATENT DOCUMENTS

| | | | |
|---|---|---|---|
| 4,879,676 | 11/1989 | Hansen | 364/748 |
| 5,075,844 | 12/1991 | Jardine et al. | 395/375 |
| 5,093,908 | 3/1992 | Beacom et al. | 395/375 |
| 5,134,693 | 7/1992 | Saini | 395/375 |
| 5,193,158 | 3/1993 | Kinney et al. | 395/375 |
| 5,197,138 | 3/1993 | Hobbs et al. | 395/375 |
| 5,341,320 | 8/1994 | Trissel et al. | 364/748 |
| 5,341,482 | 8/1994 | Cutler et al. | 395/375 |

*Primary Examiner*—Ken S. Kim
*Attorney, Agent, or Firm*—Blakely, Sokoloff, Taylor & Zafman

[57] ABSTRACT

A method and apparatus for executing floating-point instruction pairs in a pipelined manner in which exceptions are predicted during an execution stage. In response to a possible exception, the execution pipeline can stall the pipeline. The floating-point pipeline and the integer pipelines are stalled in an execution stage and a decoding stage, respectively. Once stalled, the floating-point microinstructions are executed, the state of the machine is updated and then any exceptions are reported.

11 Claims, 2 Drawing Sheets

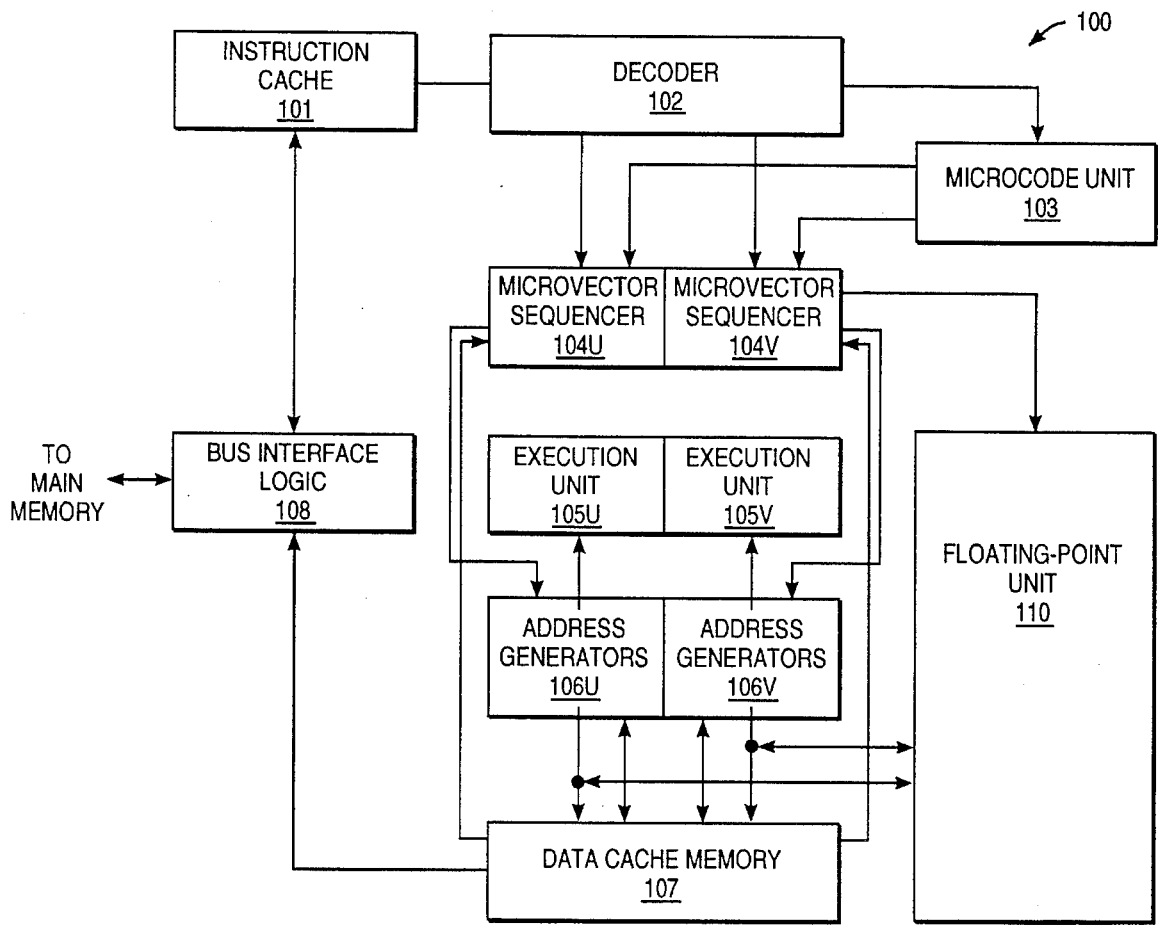
FIG_1
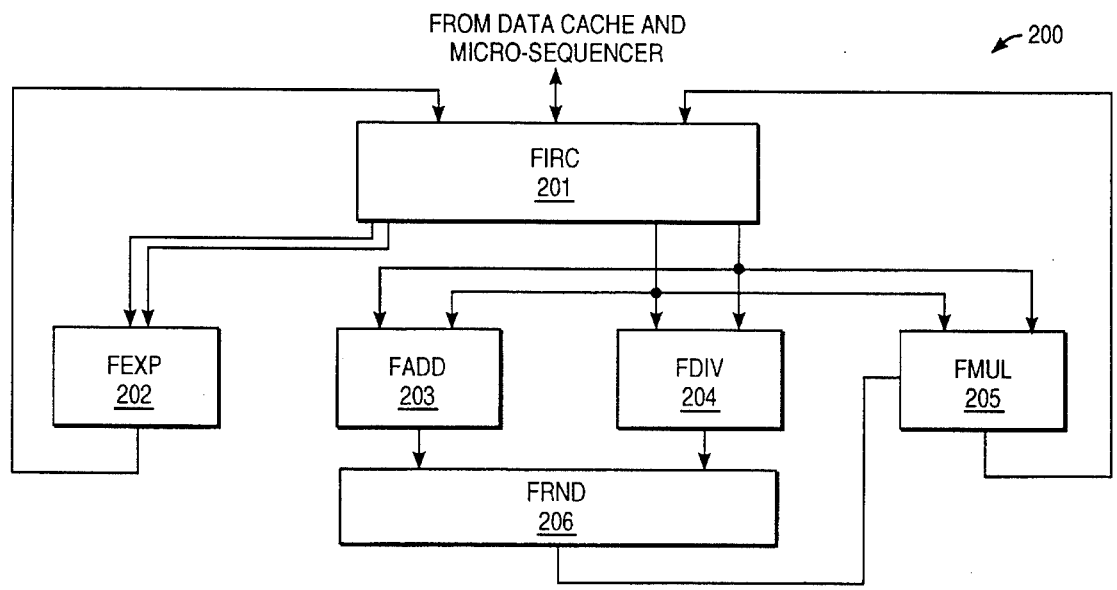
FIG_2

| IP1 | PF | D1 | D2 | E  | WB |    |    |
|-----|----|----|----|----|----|----|----|
| IP2 |    | PF | D1 | D2 | E  | WB |    |
| IP3 |    |    | PF | D1 | D2 | E  | WB |
| IP4 |    |    |    | PF | D1 | D2 | E  | WB |

FIG_3

| IP1 | PF | D1 | D2 | E  | X1 | X2 | WF | ER |
|-----|----|----|----|----|----|----|----|----|
| IP2 |    | PF | D1 | D2 | E  | X1 | X2 | WF | ER |
| IP3 |    |    | PF | D1 | D2 | E  | WB |    |
| IP4 |    |    |    | PF | D1 | D2 | E  | WB |

FIG_4

METHOD AND APPARATUS FOR EXECUTING FLOATING POINT (FP) INSTRUCTION PAIRS IN A PIPELINED PROCESSOR BY STALLING THE FOLLOWING FP INSTRUCTIONS IN AN EXECUTION STAGE

This is a continuation of application Ser. No. 07/924,742, filed Aug. 4, 1992 now abandoned.

FIELD OF THE INVENTION

The present invention relates to the field of microprocessors; particularly, the present invention relates to the field of pipelined processors.

BACKGROUND OF THE INVENTION

The function of a microprocessor is to execute programs. Programs comprise a group of instructions. The processor fetches and executes the instructions from memory or a known storage location. The processing of the single instruction can be divided into several distinct steps or stages: instructions must be fetched, instructions must be decoded, the operands must be assembled, the specified operation must be performed, and the results must be written into their destination. The processing of instructions is controlled by a periodic clock signal, the period being the processor cycle time.

Processor performance can be improved by reducing the time it takes to execute a program. One technique for increasing the performance is by overlapping the steps involved in executing several instructions. This technique is called pipelining. Each step in the pipeline completes a portion of the execution of an instruction. Each of the steps in the pipeline is called a pipe stage. Each pipe stage is separated by clocked registers or latches. The steps required to execute an instruction are executed independently in different pipeline stages provided that there is a dedicated part of the processor for each pipe stage. The result of each pipeline stage is communicated to the next pipeline stage via the register between the stages. Although pipelining does not decrease the total amount of time required to execute an instruction, it does reduce the average number of cycles required to execute a program, by permitting the processor to handle more than one instruction at a time.

Superscalar processors issue multiple instructions at a time. In this manner, a processor with multiple execution units can execute multiple instructions concurrently. This type of superscalar processor performs concurrent execution of instructions in the same pipeline stage, as well as concurrent execution of instructions in different pipeline stages. One basic design approach is to have separate integer and floating-point execution units, such that there are separate integer and floating-point pipelines.

Integer pipelines may be divided up into five stages: prefetch, decoding, address generation and operand fetch, execution, and writeback. During the prefetch stage, the integer instructions are fetched from memory or an instruction cache. During the decoding stage, the instructions fetched must be decoded in order to elicit the operation of the instruction and gather any necessary operands. Once decoding has been completed, the operation of the instruction is carried out (i.e., executed) during the execution stage. After the execution stage has been completed, the results produced by performing the operation are stored in memory or a known space (e.g., a register file) during the writeback stage.

A floating-point pipeline for executing floating-point instructions consists of essentially the same pipeline as the one utilized with integer instructions, with one important difference. The execution of the operation during the execution stage may require multiple cycles as opposed to typical integer operations requiring one cycle (i.e., cycle latency). Thus, several execution stages may be needed to complete an operation, wherein the number of execution stages varies depending on the operation. Since multiple instructions are being executed at the same time in the pipelined processor, the latency can adversely affect the execution of instructions. Because the execution of a floating-point instruction usually has a longer latency in comparison to the execution of integer instructions, it is possible that a later integer instruction would complete execution before the execution of an earlier floating-point instruction has completed.

On a conventional microprocessor architecture, instructions written by the programmer in a certain sequential order must be completed in precisely that order. Furthermore, exceptions have to be handled in a manner bearing well defined relation to the instruction sequence. For example, an exception may be defined to be handled immediately before the execution of the next sequential instruction. Given that the execution pipeline for a floating point instruction has more stages than an integer pipeline, it is possible that processor state will be updated by an integer instruction prior to the completion of a previous floating point instruction. Thus, there is a need to halt execution of instructions in the pipeline to accommodate possible exception handling.

There is also a need to handle exceptions during the execution of floating-point instructions. The exception must be handled and any action required to deal with the exception must be accommodated in the pipeline structures. Typically, some of the pipelined instructions following the floating-point instruction having the exception may have to be flushed. This includes flushing the pipeline of subsequent instructions as well, when the handling of the exception indicates that the current instructions being executed should not be in the pipeline.

The latency in the execution of the floating-point operations also impacts performance when there are data dependencies. A data dependency exists when an instruction in the instruction stream requires the result of a preceding instruction for its execution. If a subsequent instruction requires the result of a previous instruction, there is a need to stall the subsequent instruction, as well as the pipeline, to allow the later instruction to complete execution.

Moreover, the latency of cycles during execution delays any possibility of storing data results until execution is completed. However, certain operations, such as loading data from memory or a known space do not require multiple execution cycles. These could occur early in the pipeline. Thus, there is a need to allow for certain instructions to be able to writeback their results before the writeback stage and before the execution stage latency period has elapsed.

As will be seen, the present invention provides a floating-point pipeline for executing floating-point instructions. The pipeline includes a stage for handling exceptions and stalling the pipeline when an exception exists and a stage for fetching source operands from memory or the register file. The present invention also permits flushing of the integer and floating-point pipelined structures when exceptions arise. The present invention also allows for some writing back of results before the writeback stage.

SUMMARY OF THE INVENTION

A method and apparatus for executing floating-point instructions is described. The method for executing floating-point instructions includes the step of prefetching the floating-point instructions. The instructions are then decoded into one or more microinstructions. The addresses for the microinstructions are then generated. After the addresses have been generated, the operands are fetched. During the same stage, the memory and register file are read to obtain the necessary data to execute the microinstructions.

Once all the operands and data are obtained, the microinstructions are executed. During the first stage of execution, a determination is made whether the microinstruction is capable of raising an exception. After the instructions have been executed, the register file is updated. After the register file has been updated, any exceptions are reported.

BRIEF DESCRIPTION OF DRAWINGS

The present invention will be understood more fully from the detailed description given below and from the accompanying drawings of the preferred embodiments of the invention, which, however, should not be taken to limit the invention to this specific embodiment, but are for explanation and understanding only.

FIG. 1 is a block diagram of the processor utilized to implement the floating-point pipeline of the present invention.

FIG. 2 illustrates the floating-point unit utilized by the present invention to implement the currently preferred embodiment of the floating-point pipeline.

FIG. 3 is an illustration of the execution pipeline of integer instructions by the microprocessor.

FIG. 4 is an illustration of the execution pipeline of floating-point instructions and integer instructions by the microprocessor.

DETAILED DESCRIPTION OF THE INVENTION

A method and apparatus for executing floating-point instructions is described. In the following description, numerous specific details are set forth such as specific bits, bytes, and stages, etc., in order to provide a thorough understanding of the present invention. It will be obvious, however, to one skilled in the art that the present invention may be practiced without these specific details. In other instances, well known operations and functions have not been described in detail to avoid unnecessarily obscuring the present invention.

FIG. 1 illustrates a block diagram of the microprocessor utilized in the present invention. Referring to FIG. 1, instruction cache 101 is coupled with decoder 102 and bus interface logic 108. Decoder 102 receives an input from instruction cache 101 and outputs to microcode unit 103 and microvector sequencers 104u and 104v. The outputs of decoder 102 are coupled to both execution pipes, "u" and "v" at microvector sequencers 104u and 104v respectively. Microcode unit 103 also outputs to both pipes at the microvector sequencers 104u and 104v. The outputs of both pipes of microvector sequencers 104u and 104v are coupled to their respective execution units 105u and 105v. Similarly, the outputs of both microvector sequencers 104u and 104v are coupled to address generators 106u and 106v. The outputs of microvector sequencers 104u and 104v are coupled to floating-point unit 110. Floating-point unit 110 is also coupled to data cache 107. Both execution units 105u and 105v are coupled to send and receive data to and from data cache 107. The outputs of address generators 106u and 106v of the u and v pipes respectively are coupled to data cache 107. Data cache 107 is also coupled with the bus interface logic 108.

Instruction cache 101 is responsible for providing bytes of instructions to decoder 102. To perform its function, instruction cache 101 has an instruction prefetcher. The instruction prefetcher fetches instructions from main memory via bus interface logic 108 and ensures that instructions are brought into microprocessor 100. The fetched instructions are stored in its cache memory. Instruction cache 101 provides the fetched instructions to decoder 102.

Decoder 102 decodes the instructions received from instruction cache 101 and issues two microinstructions in parallel, when the second instruction is not dependent on data from the first instruction. If the microinstruction is data dependent, it is issued after the first. Microinstructions are simple opcodes which execution units 105u and 105v use to carry out the operation of the instructions from instruction cache 101. In the currently preferred embodiment, the microinstructions consist of an operation (i.e., opcode), two source register specifiers, one destination register specifier and several additional control directives. This information is then output to microcode unit 103 and microvector sequencers 104u and 104v.

Microcode unit 103 contains microinstructions for microprocessor 100 that must be performed to implement a particular instruction. Most simple instructions are decoded directly into microinstructions by decoder 102 on a one-to-one or one-to-two basis. However, for more complex instructions, microcode unit 103 generates any additional requisite microinstructions. The microinstructions generated by microcode unit 103 is then output to microvector sequencers 104u and 104v.

Microvector sequencers 104u and 104v receive the outputs from decoder 102 and microcode unit 103 and determine whether the source of the microinstructions should be from decoder 102 or microcode unit 103 (i.e., whether the operation is simple or complex respectively). Ultimately, microcode sequencers 104u and 104v direct the microcode to execution units 105u and 105v and floating-point execution unit 110 from either microcode unit 103 or decoder 102.

Address generators 106u and 106v receive outputs from microcode sequencers 104u and 104v respectively and contain the address generation and segmentation logic for microprocessor 100. Address generators 106u and 106v each generate a linear address to be used by execution units 105u and 105v to carry out the operation of the microinstruction.

Execution units 105u and 105v are two separate integer execution units for executing microinstructions input from microvector sequencers 104u and 104v respectively. Execution units 105u and 105v contain the arithmetic execution logic for microprocessor 100. Having separate execution pipes, each pipe has its own copy of the general purpose registers and an integer ALU unit. To complete execution of integer operations, both execution units 105u and 105v access data cache 107.

Data cache 107 provides two data ports. Data cache 107 receives the linear addresses from address generators 106u and 106v and returns the requested data to both execution units 105u and 105v (i.e., to both pipelines) in parallel, either from the integrated cache memory at data cache 107 or from external memory.

Bus interface logic 108 contains the logic to run bus cycles for microprocessor 100. Bus interface logic 108 receives requests from data cache 107 and instruction cache 101. It prioritizes the various requests, runs the appropriate cycle type on the pins, and returns the data to the requesting unit.

Finally, microprocessor 100 contains floating-point unit 110. A block diagram of floating-point unit 110 is shown in FIG. 2. Referring to FIG. 2, floating-point unit 200 is divided into six units, consisting of FIRC 201, FADD 203, FEXP 202, FDIV 204, FMUL 205 and FRND 206. Each of the units have control and data elements for communicating with one another. FIRC 201 is coupled to the bus from the data cache (FIG. 1) and microvector sequencer units (FIG. 1). FIRC 201 provides input operands of the microinstructions to each of FEXP 202, FADD 203, FDIV 204 and FMUL 205. The data result from FEXP 202 is input to FIRC 201. The data results of both FADD 203 and FDIV 204 are input to FRND 206. The data result of FRND 206 is input to FMUL 205. The data result of FMUL 205 is input to FIRC 201.

The floating-point interface, register file and control (FIRC) 201 contains the floating-point register stack and working registers for floating-point unit 110 (FIG. 1). FIRC 201 receives the microinstructions from microvector sequencer 104u and assigns them to FEXP 202 and one of FADD 203, FDIV 204, FMUL 205 according to their respective operation. In addition, FIRC 201 determines whether the floating-point operation might produce a fault or unrecognizable condition known as an exception. Generally, an exception causes a deviation in the program control flow due to the transfer to the exception handling mechanism. An exception results from an event that is detected by the microprocessor during the course of instruction execution.

Floating point exceptions can be further classified into two groups: 1) pre-operation exceptions and 2) post-operation exceptions. In the case of post-operation exception, the exception actually occurs before the instruction is executed. In the case of post-operation exceptions, it is not known until after the instruction is executed whether the exception will occur. In the case of post-operation exceptions, FIRC 201 determines in the X1 stage of the floating-point pipeline whether an exception may occur, as will be discussed later. If a floating-point operation might produce an exception, it is deemed "unsafe".

FIRC 201 also performs register to register transfers, loads from memory and other simple operations without the involvement of the other units. FIRC 201 completes execution of floating-point load operations by writing the data into the floating-point register file in the X1 stage, as discussed later. FIRC 201 also contains a "constant read-only memory" (ROM) that holds floating point constants. FIRC 201 itself directly executes a host of simple operations: sign manipulation, floating point constant ROM related operations, and manipulation of the exception status of the machine.

Floating-point exponent unit (FEXP) 202 performs exponent operations for all the basic operations (i.e., add, subtract, divide and square root) in response to a microinstruction from FIRC 201. FEXP 202 also supports the various numeric primitives used for complex instructions and generates the sign of the result for most operations. FEXP 202 also checks for overflow and underflow of the result. The exponent results that FEXP 202 calculates are sent to FIRC 201.

Floating-point addition unit (FADD) 203 performs the necessary operations on the significand during an addition, subtraction or other various microinstructions in response to a microinstruction from FIRC 201. FADD 203 implements several primitive operations used in complex microinstructions and also performs the integer to floating-point and floating-point to integer conversions. FADD 203 generates an unrounded result and outputs that result to floating-point rounding unit (FRND) 206.

The floating-point division unit (FDIV) 204 divides two significands or calculates the square root of one significand in response to a microinstruction from FIRC. FDIV generates an unrounded quotient, an exact remainder or square root and outputs that result to FRND 206.

FRND 206 performs rounding and normalization for the significand results which are output from FADD 203 and FDIV 204. FRND 206 performs normalization by shifting bits in the result. In the currently preferred embodiment, FRND 206 performs normalization by shifting the result left one position, right one position or right two positions. FRND 206 is capable of rounding to one of three precisions (i.e., signal, double and extended) and it can round in one of four rounding modes (i.e., round to nearest or even, round up, round down, or round to zero). Both normalization and rounding can be turned off independently of each other. The results of the rounding and normalization are sent to FIRC 201, via the floating-point multiply unit (FMUL) 205, to be written to the register file.

FMUL 205 multiplies two normalized significands, two signed integers or two unsigned integers from FIRC 201 and produces a rounded product. The rounded product is sent to FIRC 201 to be written to the register file.

Pipelined Processing in the Microprocessor

Referring back to FIG. 1, microprocessor 100 of the present invention executes instructions in a pipelined manner. The execution of integer instructions is accomplished by microprocessor 100 in a five stage pipeline having a prefetch (PF) stage, a first decode (D1) stage, a second decode (D2) stage, an execute (E) stage and a writeback (WB) stage. An example of pipelined integer execution is shown in FIG. 3. Referring to FIG. 3, the IPn refers to an instruction pair. Microprocessor 100 can execute two integer instructions during each clock cycle.

During the prefetch (PF) stage, instruction cache 101 fetches bytes of instructions. In the currently preferred embodiment, instruction cache 101 returns a complete 32-byte cache line in a single clock cycle. Typically, this translates into multiple instructions. Decoder 102 decodes the fetched instructions during the D1 stage. In the currently preferred embodiment, decoder 102 decodes two instructions during each clock. During the D2 stage, address generators 106u and 106v generate the addresses. Thus, in the currently preferred embodiment, two addresses are generated during each clock.

The main interaction between microcode sequencers 104u and 104v with execution units 105u and 105v and floating-point unit 110 occurs in the D2 and E stages. Microcode sequencers 104u and 104v drives microinstructions to the execution unit during the D2 stage. Microvector sequencers 104u and 104v asserts a signal that kills the bus cycle request when the pipeline is to be flushed or when a microinstruction making a bus request was unable to advance to the E stage due to a stall in the integer pipeline. From data cache 107, a freeze signal is sent to microvector sequencer 104u or 104v, indicating that the E stage should be frozen (i.e., halted). In response to freeze signal, microvector sequencers 104u and 104v stop sending microinstructions to the execution units 105u and 105v respectively and floating-point unit 110.

When a pair of floating-point microinstructions are determined to be "unsafe", subsequent integer instructions are frozen in the D2 stage. It should be noted that anything in the E stages (or X1-ER stages for floating-point, as discussed below) is not halted. Only the D2-E stage transfer is stalled.

In the preferred embodiment, during the E stage, execution units 105u and 105v and data cache 107 perform the arithmetic logic unit (ALU) and data cache operations executing two instructions. Data cache 107 can freeze a vector in the E (E1) stage. By doing so, data cache 107 prevents an integer microinstruction from moving to the WB stage (or E2 state in case of a multi E stage vector). Data cache 107 can also freeze a microinstruction in the E3 state, such that the microinstruction cannot advance to the WB stage until the freeze from data cache 107 is negated. When a microinstruction is frozen in the E state (E, E1 or E3), the next microinstruction is frozen in the D2 stage and all its requests are ignored by data cache 107. Once the microinstruction has competed execution in the E stage, the results are written back to the register file and memory on the next clock edge between the E stage and WB stage. Thus, each cycle of the pipeline completes a different stage of execution and integer instructions are executed in a pipelined manner.

FIG. 3 displays instruction pairs (i.e., IP1–4) being executed in the D1, D2, E and WB stage in synchronization. A new microinstruction cannot enter the D2 or E stage until the previous microinstruction has completed in both the u-pipe and the v-pipe. Each microinstruction, whether from decoder 102 or from microcode unit 103, requires one or more clocks during the E stage in order to complete execution. If a microinstruction requires multiple clocks during the E stage, microvector sequencers 104u and 104v determine when it may advance from the E stage. A microinstruction is not permitted to update its destination register until it is clocked to leave the E stage.

Floating-Point Pipeline

The floating-point pipeline for microprocessor 100 shares the first four stages with the integer pipeline and then continues with four more stages: X1, X2, WF and ER. Thus, a floating-point instruction passes through eight pipe stages: a prefetch stage, a first decode (D1) stage, a second decode (D2) stage, an E stage, an executing (X1) stage, a second executing (X2) stage, a write register file (WF) stage and an exception reporting (ER) stage. However, since the floating-point hardware is not active during the prefetch and D1 stages in the currently preferred embodiment, the floating-point pipeline can be viewed as only having six stages. The integer pipeline described in conjunction with FIG. 3 is unaware that the floating-point pipeline differs after the E stage. An example of the floating-point pipeline is shown in FIG. 4.

Referring to FIG. 4, IP1 and IP2 are floating-point instructions while IP3 and IP4 are integer instruction pairs. The IP1 instruction is shown going through the eight stages: PF, D1, D2, E, X1, X2, WF and ER. The execution of IP2 is shown with the D1 stage occurring concurrently with the D2 stage of IP1. The execution integer instruction pair IP3 is shown in the PF through WB stages, which begins concurrently with the D2 stage of IP2. Instruction pair IP4 is shown in its PF to WB stages, beginning concurrently with the D2 stage of IP3. As shown, floating-point instructions can complete at a rate of one instruction per clock and the execution of the longer floating-point pipeline does not interfere with issuing instructions down the shorter integer pipeline. It should be noted that in some special cases the floating-point pipeline is capable of executing a floating-point pair of instructions. The floating-point unit 110 employs a technique referred to as "safe instruction recognition" to determine whether operands supplied to an instruction have the potential of generating a floating-point exception. If an exception is possible on a single floating-point instruction, the floating-point pipeline of FIG. 4 stalls subsequent floating-point instructions in the E stage until a determination is made that the instruction actually does not generate an exception. If an exception is possible on a pair of floating point instructions that were issued together, subsequent integer instructions are stalled in the D2 stage, while subsequent floating-point instructions are stalled in the E stage of the pipeline.

During the prefetch stage, the instructions are prefetched. Then during the first part of the D1 stage, decoder 102 transforms the instruction opcodes into microinstructions. After decoding the instructions (or instruction pair), decoder 102 increments the prefetch pointers with the instruction length.

Microcode unit 103 also resides in the first part of the D1 stage of the pipeline. Microcode unit 103 sits idle for all single vector instructions (where decoder 102 performs all of the necessary instruction decoding itself). However, for all microinstructions, decoder 102 generates the first microinstruction while microcode unit 103 generates second and all subsequent microinstructions. Furthermore, whenever the D1 stage is halted (i.e. frozen), microcode unit 103 remembers to repeat the previous request. The microinstructions are then output by microcode unit 103 to microvector sequencers 104u and 104v.

In the later part of the D1 stage, microvector sequencers 104u and 104v select the source of the new microinstructions. Microvector sequencers 104u and 104v utilize a multiplexer to select a microinstruction from decoder 102 or microcode unit 103. For each microinstruction, the first and possibly the only microinstruction comes from decoder 102. All subsequent microinstructions come from microcode unit 103. Only macroinstructions that contain a single microinstruction can be paired by decoder 102. When paired microinstructions are generated by microcode unit 103, microvector sequencers 104u and 104v ensure that the microinstructions advance through the floating-point pipeline in a lock-step fashion (i.e., the paired instructions advance at the same time from one stage to the next). Thus, in the floating-point pipeline, the microinstructions are transferred into a stream of microinstructions which are sent to microvector sequencer 104v in the D2 stage.

FIRC 201 receives and decodes microinstructions from microcode sequencer 104 in the D2 stage. The E stage is the operand fetch and memory read/write stage for floating-point instructions. Thus, in the present invention, the status (i.e., registers in the register file and memory) of the machine is mad in the E stage. The latency of instructions is not affected by the location of the operands. Thus, an operation with an operand in memory is just as fast as one with both operands in the register file. This is not true in the integer pipeline. Notice as well that the reading of the state of the machine occurs one stage later than in the integer pipeline. Thus, the start of execution of a floating-point instruction is delayed one cycle in the floating-point pipeline. Data transfers between FIRC 201 and either the integer register file or memory also occur during the E stage. FIRC 201 can read a value from the floating-point register file or it can read a value that is sent by the execution units 105u and/or 105v or data cache 107. FIRC 201 is capable of driving a value onto the bus in the E stage that is to be sent to execution units 105u and/or 105v.

During the X1 stage, FIRC 201 executes floating-point simple microinstructions such as completing loads from memory and simple data transfer operations. Simple data transfer operations include moves between registers in the register file, moves and exchanges on the stack, etc. These simple data transfer microinstructions complete in one cycle and permit FIRC 201 to writeback the results (i.e., update the state of the machine) of these operations during the X1 stage.

In the X1 stage, most of the floating-point instructions begin execution. Also, during the X1 stage of floating-point instruction execution, FIRC 201 performs safe instruction recognition, in that FIRC 201 examines the data and opcodes of certain microinstructions and determines whether the microinstruction is guaranteed not to raise a special situation (which may even end up as an exception). If so, the microinstruction is labeled "safe." If the microinstruction is capable of raising a special situation, it is labeled "unsafe".

If there is a single or pair of floating-point instructions that are determined to be unsafe in the floating-point pipeline, FIRC 201 stalls the subsequent floating-point microinstruction at the E stage in the pipeline, thereby preventing all subsequent microinstructions in the floating-point pipeline from continuing execution until the exception condition is known and is handled by an exception handler (not shown) or the microinstruction completes without an exception. Also if a floating-point instruction pair is issued, FIRC 201 stalls the integer execution pipeline at the D2 stage to prevent integer instructions from reaching the E stage. The integer microinstructions are stalled until the floating point pair is declared safe or until the pair hits the ER stage. This is because in the currently preferred embodiment, when a floating-point post-operation exception occurs, the program sequence should be aborted before the next floating-point instruction is executed, and once integer instructions reach the E stage, they cannot be stopped. It should be noted that if a single floating-point instruction is labeled unsafe, the integer pipeline need not stall. Furthermore, it should be noted that if an exception did occur during the execution of the floating-point pair, then the stalled floating-point and integer pipelines will be flushed after the ER stage of the execution of the floating-point pair.

FIRC 201 writes values into the register file during the X1 clock for simple instructions or for register transfers and load operations. For other operations, results are not written until the WF stage. A bypass is specified by a pair of ports that get bypassed. Floating-point unit 200 includes bypass hardware which permits bypassing the X1 stage write port and the E stage read port, and bypassing the WF stage write port and the E stage read port. When values are written into the register file in FIRC 201 during the X1 clock, the data is written in through one of the two write ports to the register file. However, if the data being written is required by an instruction in its E stage of execution, the hardware allows the data to go straight to the E stage, as well as be written into the register file. This bypass of two ports saves a clock cycle.

Referring to FIG. 2, FIRC 201 sends operands and "start signals" to the execution units FADD 203, FEXP 202, FDIV 204 and FMUL 205 in the X1 clock. In the currently preferred embodiment, the entry of a first microinstruction into the X1 stage marks the start of the instruction execution, and no external event, except reset, can prevent the completion of its execution. FEXP 202 receives its microinstruction opcode, precision control directives and the exponents of the operands from FIRC 201 in the X1 stage. In the same cycle, FEXP 202 generates the alignment control for FADD 203 and FDIV 204. FEXP receives a normalization count from FADD 203 in the X2 stage, as well as another normalization count from FMUL 205 and FRND 206 in the WF stage.

FEXP 202 also checks for overflow and underflow of the result. The exponent results that FEXP 202 calculates are sent to FIRC 201 during the WF stage.

FADD 203 operates during the X1 stage and the X2 stage of the floating-point pipeline. It obtains either one or two significand operands from FIRC 201 in the X1 stage at the beginning of the X1 clock. It performs calculations in the X1 and X2 stages and passes the unrounded result to FRND 206 at the end of the X2 stage.

FDIV 204 operates in the X1 and X2 stages and divides two significands or calculates the square root of one significand. It receives either one or two significand operands from FIRC 201 and some control from FEXP 202 in the X1 stage. The divide hardware continues operation in X1 iterating for a number of cycles until the proper number of bits have been calculated. FDIV 204 delivers an unrounded quotient, an exact remainder or a square root. The quotient will be rounded during the WF stage in FRND 206. Unlike other pipeline stages in other units, FDIV 204 X1 stage requires several clocks. In the currently preferred embodiment, for the floating-point divide instruction, the X1 stage takes seventeen cycles for single precision, thirty-one cycles for double precision, and thirty-seven cycles for extended precision for a divide operation. Typically, all other pipeline stages require only one cycle.

FRND 206 performs the rounding and normalization for the FADD 203 and FDIV 204 sections. FRND 206 operates only on a significand and sends its results to FMUL 205 where they are passed through and sent to FIRC 201 to be written to the register file. FRND 206 obtains an unrounded significand from FADD 203 or FDIV 204 in the X2 stage. FADD 203 multiplexes its result significand with the result significand from FDIV 204 and then drives the output of the multiplexer to FRND 206. In the preferred embodiment, the input significand to FRND 206 is sixty-eight bits wide and gets rounded and normalized during the WF stage according to rounding control, precision control, primitive microoperation control, and sign information supplied by FEXP 201. The resulting significand is sent to FMUL 205 to be multiplexed with the output of FMUL 205 and then sent to FIRC 201 in order to be written into the register file.

It should be noted that not all results from FEXP 202, FADD 203, FDIV 204, FMUL 205 and FRND 206 are written back to the register file during the WF transition. If FIRC 201 determines that a microinstruction has a pre-operation exception, then the write operation to update the register file and state of the machine is aborted. In the currently preferred embodiment, the abort operation is controlled by FIRC 201 in that FIRC 201 does not enable the write signals to complete the write operation. However, if the microinstruction has a post-operation exception, then the results are written into the register file.

Besides performing rounding and writing to the register file during the WF stage, a second bypass exists which permits bypassing from the WF stage to the E stage. When values are being written into and read out of the same location of the register file during the same cycle, the bypass permits the new data to be passed to the E stage. This guarantees that correct data goes to the E stage as fast as possible.

Once the results have been written back into the register file, the status word is updated during the ER stage on the last microvector. The ER stage is also the exception reporting stage. Although exceptions may occur during execution, their handlers are not invoked in the currently preferred embodiment until the occurrence of the next floating-point instruction. In the currently preferred embodiment, a set of flags in FIRC 201 are set if an instruction encounters a special situation. If there are no exceptions, the status word is updated.

If an exception condition is generated by a previous microinstruction, on the occurrence of the next floating-point instruction, FIRC 201 generates signals to flush the floating-point and integer pipelines from the E stage down.

If one instruction in a floating-point instruction pair incurred an exception, the floating-point pipeline is flushed on the occurrence of the next floating-point instruction. Therefore, if a floating-point instruction had been stalled in the E stage (because of a determination that one of the instructions in the floating-point instruction pair is capable of generating an exception), then the floating-point pipeline is flushed from the E stage down. If the first instruction in a floating-point instruction pair incurred an exception, the integer pipeline is flushed at the occurrence of the next integer instruction because the next floating-point instruction to occur is the second floating point instruction in the pair. Therefore, if an integer instruction had been stalled in the D2 stage (because of a determination that one of the instructions in the floating-point instruction pair is capable of generating an exception), then the integer pipeline is flushed from the D2 stage down. However, if the second instruction in the floating-point pair incurred an exception, the integer pipeline is not flushed until the occurrence of the next floating-point instruction.

When the flush occurs, a microcoded exception handler is invoked to perform whatever fix-up steps are required. However, in most cases, there is no exception and no flush is necessary. Thus, after the ER stage, the execution of floating-point instructions is complete, having a 1-cycle throughput in most cases.

Whereas many alterations and modifications of the present invention will no doubt become apparent to a person of ordinary skill in the art after having read the foregoing description, it is to be understood that the particular embodiment shown and described by illustration are in no way intended to be considered limiting. Therefore, reference to the details of the preferred embodiments are not intended to limit the scope of the claims which themselves recite only those features regarded as essential to the invention.

Thus, a method and apparatus for executing floating-point instructions has been described.

We claim:

1. A method of executing floating-point instructions in a processor in a computer system, said method comprising the steps of:

decoding each of said floating-point instructions into one or more microinstructions;

issuing two of the one or more microinstructions as a floating-point microinstruction pair to an on-chip, pipelined floating-point execution unit in the processor that executes the floating-point instruction pair in a plurality of execution stages in a locked-step manner, such that both microinstructions in the pair advance at the same time from one stage to the next;

fetching operands and data necessary to execute said floating-point microinstruction pair during a first (E stage) of the plurality of stages in which the floating-point execution unit executes floating-point read/write memory microinstructions;

executing the floating-point microinstruction pair in a second (X1 stage) and subsequent stages of plurality of execution stages to generate results, wherein said step of executing comprises the steps of determining during the second (X1) stage whether one of the microinstructions in said floating-point microinstruction pair is capable of raising an exception;

stalling a floating-point microinstruction that is immediately subsequent to the floating-point microinstruction pair in the first (E) stage of the plurality of execution stages after fetching operands and any integer microinstruction in a separate integer execution pipeline in the processor that is in a decoding stage that precedes execution while continuing to execute the floating-point microinstruction pair if said step of determining determines that at least one of the microinstructions in the floating-point instruction pair is capable of raising an exception, updating a register file using said results; and then reporting said exception, wherein the step of reporting includes handling said exception.

2. The method as defined in claim 1 wherein said any integer microinstruction is stalled in a decoding stage in which one or more addresses are generated in the separate integer execution pipeline.

3. The method defined in claim 1 wherein any integer microinstruction in an execution stage of the integer pipeline continues execution until completion when the step of determining determines said one of the microinstructions in the floating-point microinstruction pair is capable of generating an exception.

4. The method as defined in claim 1 wherein if the exception occurs as a result of executing said one of the microinstructions in the floating-point microinstruction pair, then said of handling the exception includes the step of flushing the pipelined floating-point execution unit at an occurrence of a floating-point microinstruction that follows said one of the microinstructions in the floating-point execution unit, wherein any floating-point microinstructions being being fetched or decoded in the pipelined floating-point execution unit are flushed.

5. The method as defined in claim 3 wherein if the exception occurs as a result of executing said one of the microinstructions in the floating-point microinstruction pair, then said method includes the step of flushing said any integer microinstruction and integer microinstructions being decoded or fetched in the separate integer execution pipeline at an occurrence of a floating-point microinstruction that follows said one of the microinstructions in the floating-point execution unit.

6. The method as defined in claim 4 wherein if the first microinstruction of the floating-point microinstruction pair incurs the exception such that the second microinstruction of the floating-point instruction pair constitutes the floating-point microinstruction that follows said one of the microinstructions in the floating-point execution unit, then the step of flushing comprises flushing the pipelined floating-point execution unit as soon as the exception is reported.

7. The processing unit defined in claim 1 wherein the step of stalling a floating-point microinstruction comprises the steps of a data cache memory in the processor generating a signal that prevents the floating-point microinstruction from moving through execution stages in the pipelined processor.

8. The processing defined in claim 1 wherein the step of stalling a floating-point microinstruction comprises the steps of the data cache signalling a microcode sequencer in the processor to stall the floating-point microinstruction.

9. A processing unit for processing a plurality of instructions, said processing unit comprising:

an integer pipeline for executing integer instructions in said plurality of instructions as integer microinstructions in a plurality of stages which includes a first decoding stage (D1) in which the integer instructions are decoded into integer microinstructions and a second decoding stage (D2) in which addresses are generated for the integer microinstructions prior to execution of the integer microinstructions; and a floating-point pipeline for executing floating-point instructions in said plurality of instructions as a plurality of floating-point microinstructions, wherein two of the plurality of floating-point microinstructions are issued as a floating-point instruction pair and the floating-point pipeline executes the floating-point instruction pair in a plurality of execution stages in a locked-step manner, such that both microinstructions in the pair advance at the same time from one stage to the next, wherein the floating-point pipeline comprises a first execution stage (E) fetching operands and data necessary to execute said floating-point microinstruction pair and in which the floating-point execution unit executes floating-point read/write memory microinstructions;

a second (X1) and subsequent execution stages executing the floating-point microinstruction pair to generate results, wherein during the second (X1) stage, the floating-point pipeline determines whether one of the microinstructions in said floating-point microinstruction pair is capable of raising an exception, and, if so, stalls a floating-point microinstruction that is immediately subsequent to the floating-point microinstruction pair in the first (E) stage after fetching operands and stalls any integer microinstruction in the integer pipeline that is in the D2 decoding stage while continuing to execute the floating-point microinstruction pair, a writeback stage updating a register file using said results, and an exception reporting stage reporting said exception in which any exception is handled.

10. The processing unit defined in claim 9 wherein execution of an immediately subsequent floating-point microinstruction is halted at an end of an operand fetch stage.

11. An apparatus for executing a plurality of floating-point instructions in a floating-point instructions in a floating-point pipeline in a plurality of stages in a processor in a computer system, said apparatus comprising:

decoding means for decoding said plurality of floating-point instructions into a plurality of microinstructions, wherein the decoding means comprises means for issuing two of the plurality of microinstructions as a floating-point microinstruction pair;

fetching means for fetching operands and data necessary for executing said floating-point microinstruction pair during a first execution stage (E stage) of the plurality of stages in which the floating-point execution unit executes floating-point read/write memory microinstructions;

executing means for executing said floating-point microinstruction pair in a locked-step manner in a second execution stage (X1) and subsequent stages of the plurality of stages, such that both microinstructions in the pair advance at the same time from one stage to the next, wherein said executing means generates results when executing said plurality of microinstructions, wherein said executing means includes means for determining during the second execution stage (X1) whether one of the microinstructions in said floating-point microinstruction pair is capable of raising an exception, and means for stalling a floating-point microinstruction that is immediately subsequent to the floating-point microinstruction pair in the first execution stage (E) of the plurality of stages after fetching operands and any integer microinstruction in a separate integer execution pipeline in the processor that is in a decoding stage that precedes execution while continuing to execute the floating-point microinstruction pair if said means for determining determines that at least one microinstruction in the floating-point instruction pair is capable of raising an exception;

updating means for updating said register file using said results;

means for reporting said exception, if any, wherein the means for reporting includes means for handling said exception, said updating of said register file.

* * * * *

UNITED STATES PATENT AND TRADEMARK OFFICE
CERTIFICATE OF CORRECTION

PATENT NO. : 5,559,977
DATED : September 24, 1996
INVENTOR(S) : Avnon et al.

It is certified that error appears in the above-identified patent and that said Letters Patent is hereby corrected as shown below:

In column 8 at line 50 delete "mad" and insert --read--

Signed and Sealed this

Fifteenth Day of July, 1997

Attest:

BRUCE LEHMAN

*Attesting Officer*          *Commissioner of Patents and Trademarks*